(12) United States Patent
McDonald

(10) Patent No.: US 7,255,059 B1
(45) Date of Patent: Aug. 14, 2007

(54) ADJUSTABLE ADAPTER ASSEMBLY

(75) Inventor: Gerald McDonald, Panama City, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 228 days.

(21) Appl. No.: 11/110,995

(22) Filed: Apr. 11, 2005

(51) Int. Cl.
*B63B 17/00* (2006.01)
*B63B 29/04* (2006.01)

(52) U.S. Cl. ........................ 114/364; 114/188; 114/343; 114/195

(58) Field of Classification Search ................ 114/195, 114/343, 364, 188
See application file for complete search history.

(56) References Cited

U.S. PATENT DOCUMENTS 5,431,362 A * 7/1995 Carnahan et al. ........... 248/159

* cited by examiner

*Primary Examiner*—Lars A. Olson
*Assistant Examiner*—Daniel V. Venne
(74) *Attorney, Agent, or Firm*—James T. Shepherd

(57) ABSTRACT

An adjustable adapter assembly secures a framework/console to an anchoring fixture. A housing member connected to the framework has two pairs of parallel walls having laterally aligned elongate first slots and laterally aligned elongate second slots, respectively. A clasping mechanism inside the housing member has a shank portion and finger members. First and second threaded orthogonal bores laterally extend through the shank portion, a first threaded bolt extends through the first slots and first threaded bore, and a second threaded bolt extends through the second slots and second threaded bore. Rotating the first and second bolts laterally displaces the clasping mechanism to align the finger members with part of an anchoring fixture on the deck for engagement by the finger members when a locking ring is appropriately displaced. Several assemblies secured to the framework can be adjusted to interconnect with permanently mounted anchoring fixtures in the deck.

15 Claims, 6 Drawing Sheets

ADJUSTABLE ADAPTER ASSEMBLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to an apparatus for attaching and securing equipment to a surface. More particularly, this invention securely aligns and affixes an instrumentation console on the deck of a flying platform to prevent damage.

Scientific research and working applications requiring transport of sophisticated sensor instrumentation and electronics-package consoles frequently are mounted on moving platforms. These platforms can travel through the air or overland, or under or on water, and in the transportation process the platforms can be exposed to risks of damage. A damaged console can compromise its ability to function reliably, and different ways have evolved to secure each console.

Helicopters tend to create dynamic stresses because of on-board machinery, rotating blades, and their inherent flight characteristics. One mechanism for securing the consoles has a three dimensional framework securely connected to the package with supporting legs that hold the console at a level that can make it accessible to technician-operators. One side of the framework is securely connected to an inside surface of one side of the helicopter fuselage and the lower ends of the legs hopefully align with, fit into, and interlock in mounting fixtures located in the deck of the helicopter. The deck mounting fixtures are made as an integral part of the deck structure and are shaped to receive, mate, and interlock with the lower ends of the legs to securely engage the lower ends, framework, and console to the deck.

Practical experience has demonstrated, however, that the spatial arrangements of the lower ends of the framework and mounting fixtures in a deck may not always be the same. Consequently, the lower ends of the legs and the mounting fixtures may not align and interlock with each other because of discrepancies of manufacture, strains in the helicopter airframe/deck, bending damage to the framework, etc.

Misalignment will probably be discovered under stressful situations, such as during preparation for a mission for example. Crewmembers might hastily bend the framework legs to roughly fit and force the lower ends of the legs into the deck fixtures. These hasty attempts might break off the ends of the legs or fail to securely fit the bent ends to the deck fixtures. Thus, the console on the framework may not be secured, and as a result, it may not operate properly.

Thus, in accordance with this inventive concept, a need has been recognized in the state of the art for an adjustable adapter assembly for securely engaging an instrumentation console to a deck fixture on a moving platform and a plurality of adjustable adapter assemblies on a framework that can adjust to accommodate existing prelocated anchoring fixtures on the platform to assure secure engagement.

SUMMARY OF THE INVENTION

The present invention provides an adjustable adapter assembly for securing a framework coupled to a console to an anchoring surface. A housing member connected to the framework or console has a first pair of parallel walls and a second pair of parallel walls. The first parallel walls have laterally aligned elongate first slots and the second parallel walls have laterally aligned elongate second slots. A clasping mechanism having a shank portion, finger members extending from the shank portion, and a locking ring on the finger members are disposed inside of the housing member between the first and second pairs of parallel walls. First and second threaded bores laterally extend through said shank portion in a mutually orthogonal relationship and a first threaded bolt extends through the first slots and first threaded bore and a second threaded bolt extends through the second slots and second threaded bore. Lateral displacements created by rotating the first bolt and second bolt align the finger members and a part of an anchoring fixture at the anchoring surface to allow engagement of the part of the platform of the anchoring fixture by the finger members.

An object of the invention is to provide an adjustable adapter assembly connected to a console for aligning with and securely engaging a mounting fixture in a deck.

Another object of the invention is to provide an adjustable adapter assembly to securely engage an instrumentation console on a dynamic support platform.

Another object of the invention is to provide a plurality of quickly adjustable adapter assemblies each on a separate leg of a framework to support an instrumentation console for aligning with and securely engaging pre-located mounting fixtures in a deck, and to be adapted to seat racks, equipment racks, storage containers, and anything else that needs alignment to be fastened to a deck, fuselage, wall, ceiling, etc.

Another object of the invention is to provide an adjustable adapter assembly to securely engage an instrumentation console that is robust, uncomplicated, and easily installed to engage mounting fixtures.

Another object of the invention is to provide a cost-effective adjustable adapter assembly to securely engage an instrumentation console having few parts to assure ease of installation.

Another object is to provide an adjustable adapter assembly being adjustable in two mutually orthogonal axes to permit secure engagement of a console-supporting framework on a deck-fixture.

These and other objects of the invention will become more readily apparent from the ensuing specification when taken in conjunction with the appended claims.

DESCRIPTION OF THE PREFERRED EMBODIMENT

Figure 1:
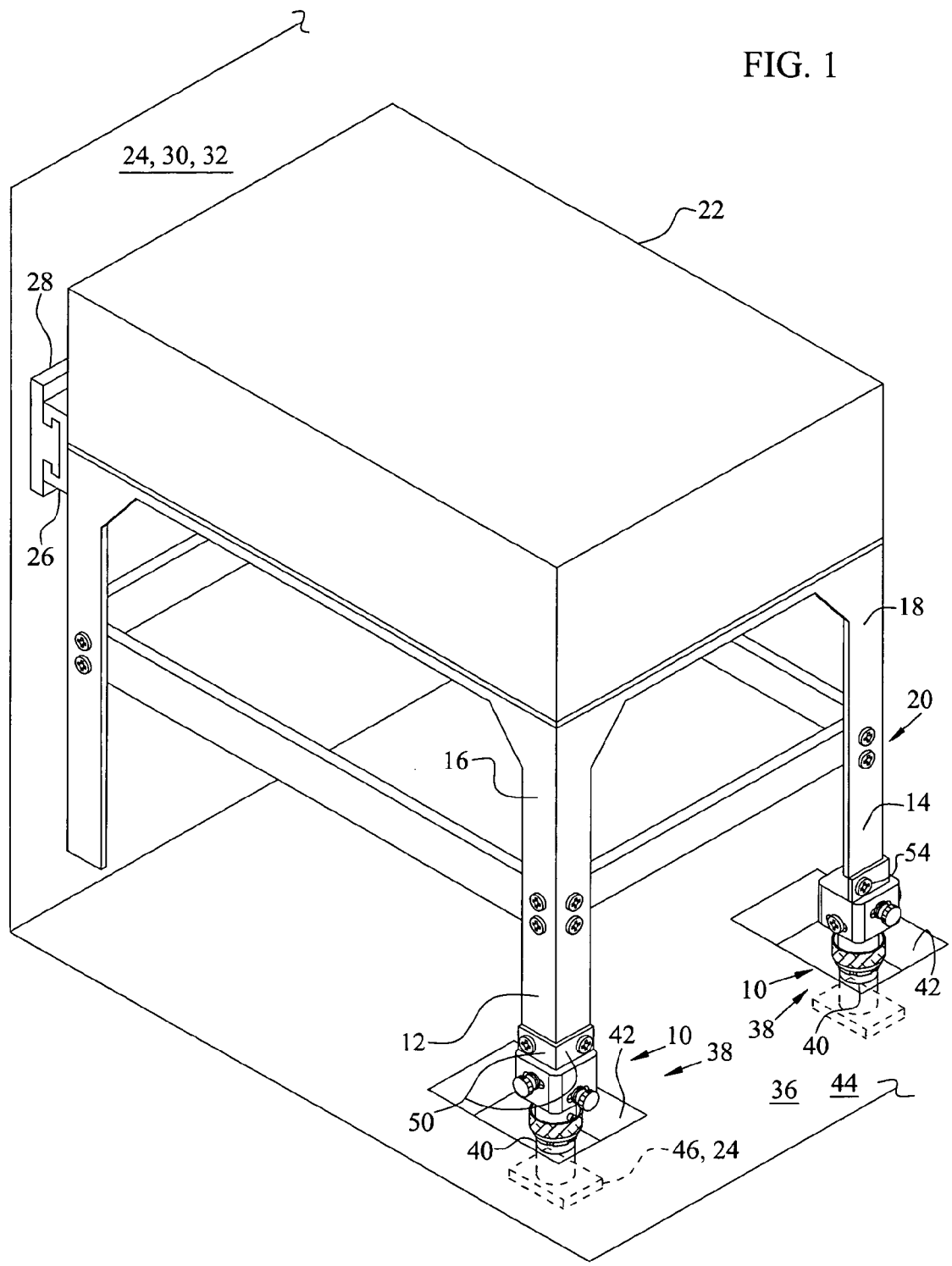
FIG. 1 is an isometric view showing adjustable adapter assemblies of the invention for securing end portions of legs of a console-laden framework on a deck of a helicopter.
Figure 2:
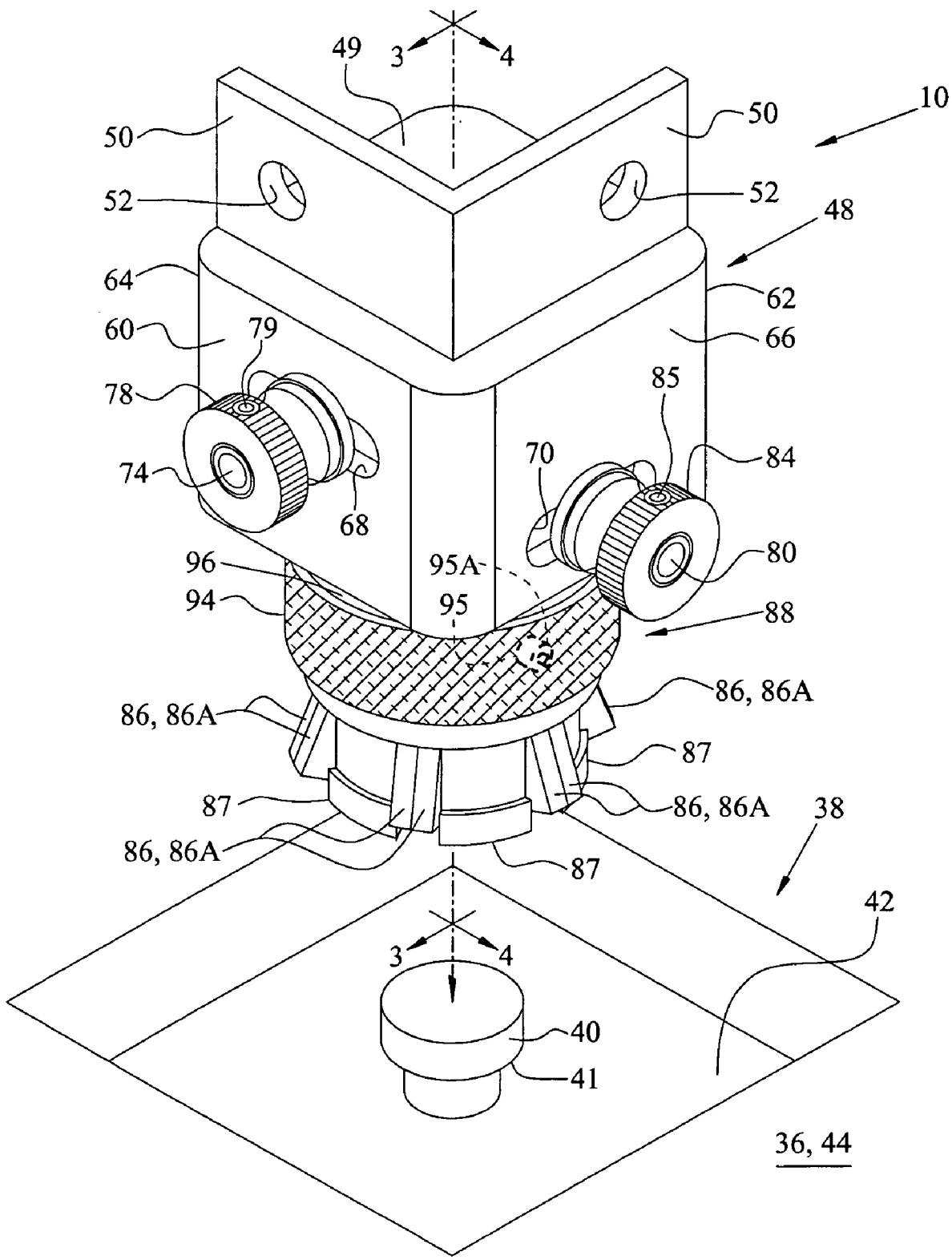
FIG. 2 is an isometric view showing details of the adjustable adapter assembly capable of mutually orthogonal displacements.

Referring to FIGS. 1 and 2, a separate adjustable adapter assembly 10 is mounted on each lower end portion 12 and 14 of front and rear legs 16 and 18 of a three-dimensional support framework 20. Framework 20 is fabricated from a rigid strong material, such as steel, heavy-duty aluminum, etc. for bearing the substantial load of an instrumentation package or console 22. Framework 20 is connected to and supports console 22 such as the precise navigation console (PNC) for a helicopter 24 (an MH53-E of the U.S. Navy for example) or any number of other mobile platforms including land-based tracked or wheeled vehicles, surface or submerged vessels, rotary or fixed wing aircraft, etc. Optionally, framework 20 might be dispensed with and a chassis or protective enclosure of console 22 can have adjustable adapter assembly 10 directly connected to it as elaborated on below.

Operation of any one of these mobile platforms like helicopter 24 can subject relatively delicate sensors and interconnected electronics of console 22 to dynamic stresses that can compromise their effectiveness. These dynamic stresses may be caused by disturbances particularly during travel and maneuvers during a mission. If console 22 were not positively secured to helicopter 24 during operations, sustained reliable performance of console 22 is not likely.

The exemplary helicopter 24 also tends to create dynamic stresses because of its on-board machinery, rotating blades and flight characteristics. Accordingly, helicopter 24 can have one part of a standardized fitting 26 on framework 20 that mates with and is secured along its length to its standardized mating counterpart 28 on the inside surface 30 of fuselage 32. An elongate folding foot structure (not shown) can be provided on framework 20 below fitting 26. Foot structure is normally pivoted out of the way and concealed by framework 20 as shown in FIG. 1, but can be folded out to hold console 20 in a level orientation before it is secured to fuselage 32.

In accordance with adjustable adapter assembly 10 of the invention the opposite side of framework 20 from fitting 26, front and rear legs 16 and 18 are adapted to be securely connected to pre-located permanent anchoring deck fixtures 38 in deck 36 via adjustable adapter assemblies 10. Each permanent anchoring fixture 38 in deck 36 has a mushroom-shaped post 40 extending upward in a recess 42 that extends below an upper surface 44 of deck 36. Each mushroom-shaped post 40 of each anchoring fixture 38 is firmly secured to a frame member 46 of helicopter 24, and each post 40 has a downward facing annular rim 41.

Referring also to FIGS. 3A, 3B, 4, and 5, each adjustable adapter assembly 10 has a shell-shaped housing member 48 having an upper end wall 49. Housing member 48 including wall 49 are connected to a pair of upward extensions 50 provided with holes 52 of sufficient diameter to slideably receive threaded bolts 54. Bolts 54 are sized to further extend through holes 56 in each of lower end portions 12 and 14. End portions 12 and 14 are each placed to rest on end wall 49 of separate assemblies 10, and nuts 57 are rotated on bolts 54 until they are tight to tightly secure each housing member 48 to a separate one of legs 16 and 18 and position housing member 48 having a downwardly facing square-shaped opening 58.

Housing member 48 has a first pair of parallel wall portions 60 and 62 interconnected to and orthogonally disposed with respect to a second pair of parallel wall portions 64 and 66. A first pair of aligned and parallel elongate slots 68 is provided in parallel wall portions 60 and 62, and a second pair of aligned and parallel elongate slots 70 is provided in parallel wall portions 64 and 66. Wall portions 60, 62 64, and 66 create an internal cube-shaped volume 72 disposed between elongate slots 68 and 70.

Figure 3A:
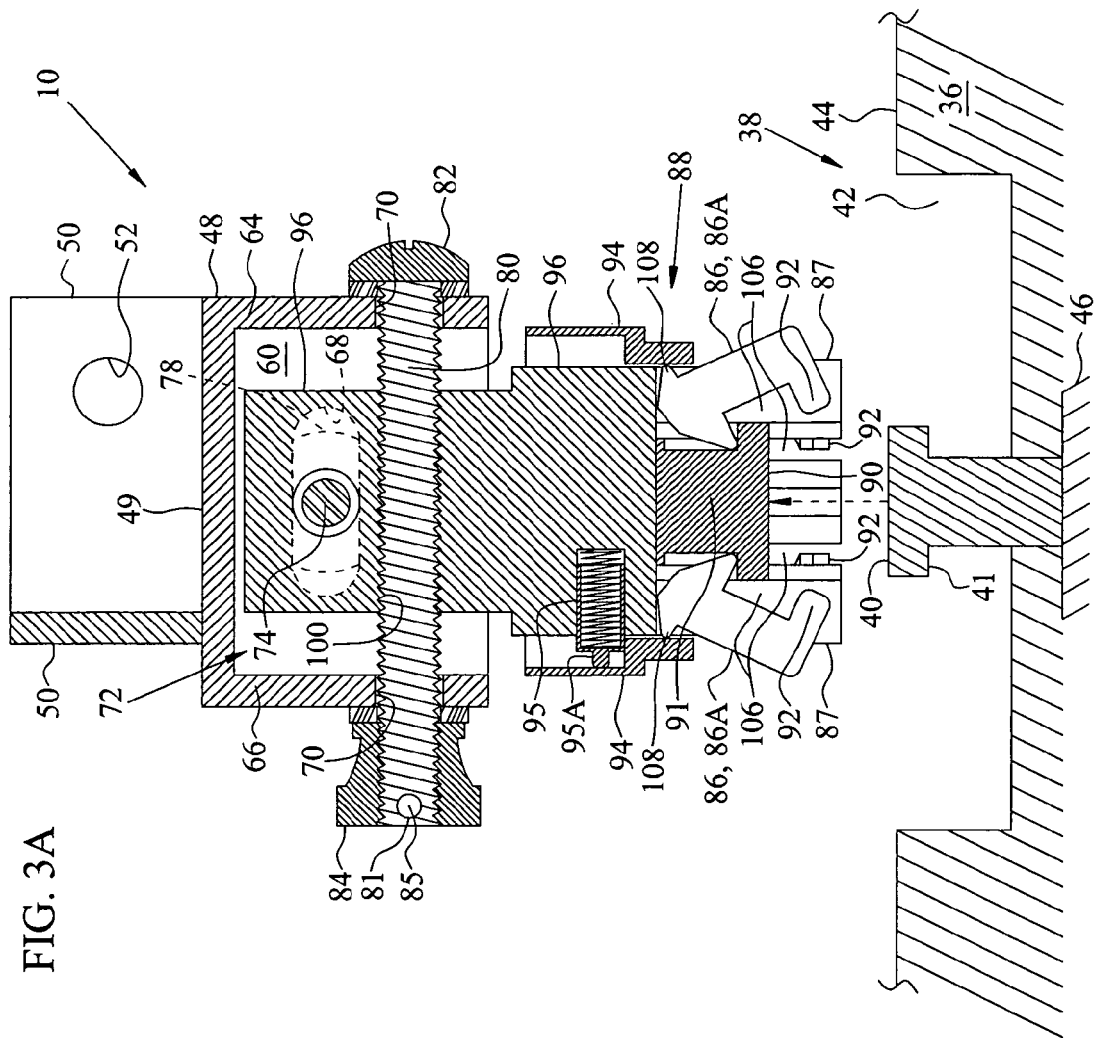
FIG. 3A is a cross-section view of the adjustable adapter assembly taken along lines 3-3 in FIG. 2 showing details of the shank portion for permitting lateral displacement of a clasping mechanism along a first axis and finger members of the clasping mechanism in the open position for receiving a post.
Figure 4:
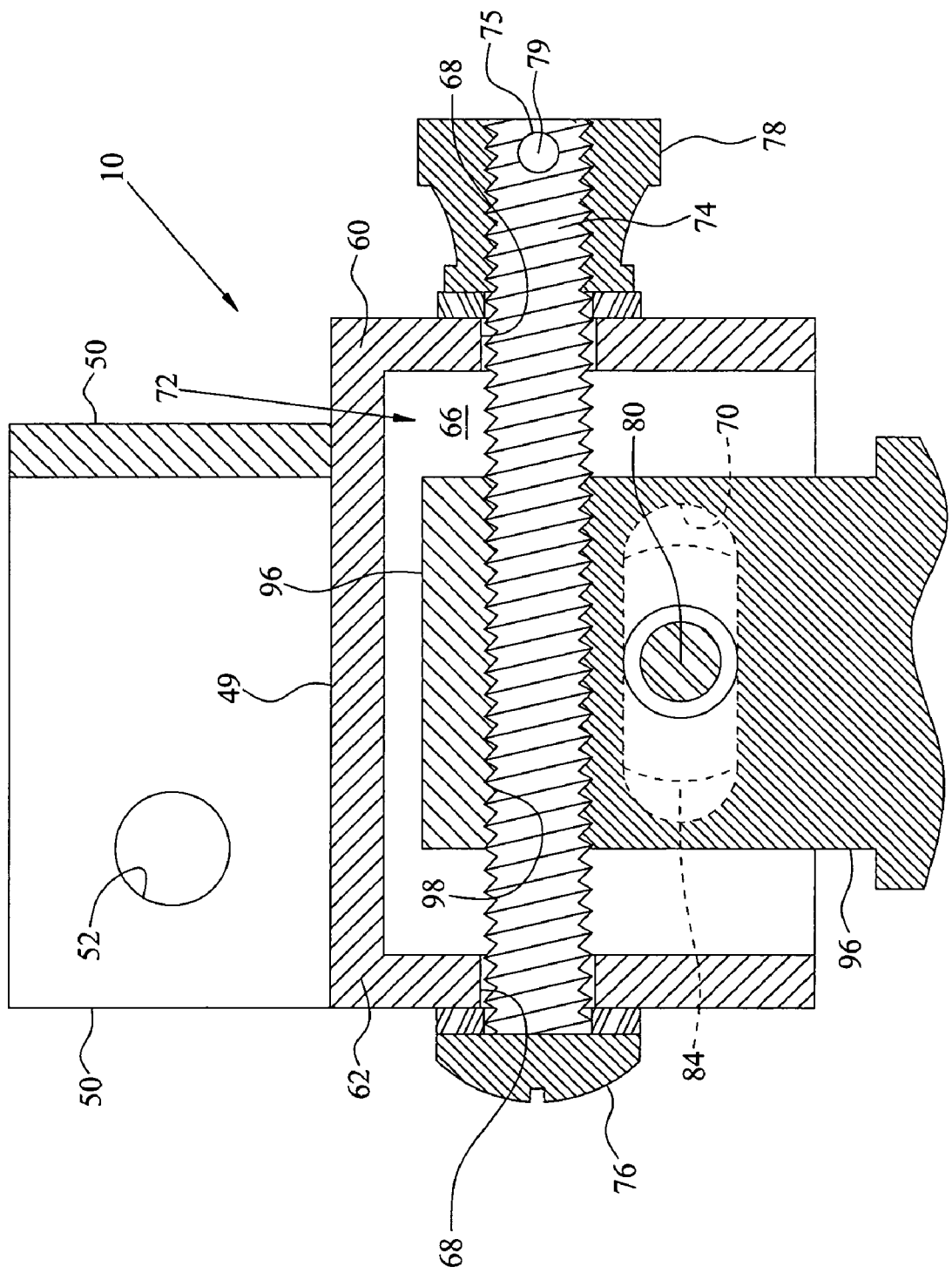
FIG. 4 is a partial cross-section view of the adjustable adapter assembly taken along lines 4-4 in FIG. 2 showing details of the shank portion for permitting lateral displacement of the clasping mechanism along a second axis orthogonal to the first axis to assure secure mating with a post of a deck fixture.
Figure 5:
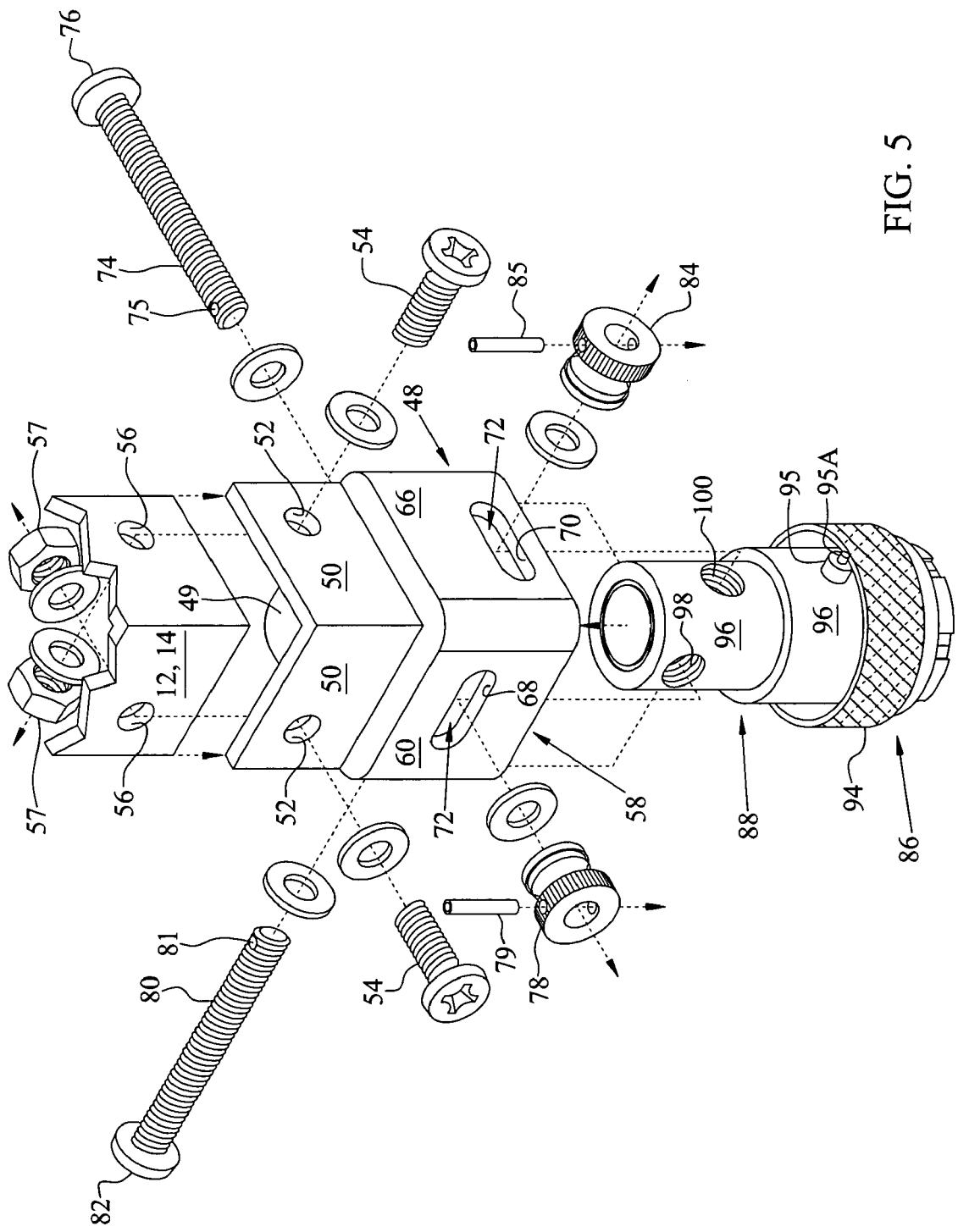
FIG. 5 is an exploded view of the adjustable adapter assembly.

As shown in greater detail in FIGS. 3A and 4, a threaded bolt 74 extends through one of elongate slots 68, through volume 72, and through the other one of slots 68. Bolt 74 is sized for lateral sliding displacement along the length of slots 68 between their opposite ends. Bolt 74 has a flat bolt head 76 at one end and a knurled nut 78 secured to its other end via a pin 79 extending through hole 75 in bolt 74 to retain bolt 74 in slots 68. A threaded bolt 80 extends through one of elongate slots 70, through volume 72, and through the other one of slots 70. Bolt 80 is sized for lateral sliding displacement along the length of slots 70 between their opposite ends. Bolt 80 has a flat bolt head 82 at one end and a knurled nut 84 secured to its other end via a pin 85 extending through a hole 81 in bolt 80 to retain bolt 80 in slots 70. Optionally, washers can be provided on bolts adjacent to bolt heads 76 and 82 and knurled nuts 78 and 84.

Annular rim 41 of each mushroom-shaped post 40 of each anchoring fixture 38 in deck 36 is shaped to be engaged by and securely mate with pivotable finger-like members 86 of a cylindrically-shaped clasping mechanism 88. Pivotable finger-like members 86 and longitudinally extending spacer members 87 are disposed to alternate with respect to one another in clasping mechanism 88 in an inter-digitally disposed fashion. As elaborated on below, this engagement and secure mating between clasping mechanism 88 and deck fixture 38 occurs when an end surface 90 of a retainer structure 91 of clasping mechanism 88 is manually placed to be next-to or abut-on mushroom-shaped post 40 inside of spacer members 87. This placement also locates post 40 inside of spacer members 87 so that hook portions 92 of finger-like members 86 extend over post 40 and past and below annular rim 41. When so positioned, a locking ring 94 is longitudinally displaced along spacer members 87 of clasping mechanism 88 to cover outer portions 86A of finger-like members 86. This displacement of locking ring 94 on finger members 86 forces hook portions 92 to converge in a radially inwardly direction until they come around and engage annular rim 41 and secure clasping mechanism 88 to post 40. A spur 95A of a spring-loaded detent mechanism 95 on a shank portion 96 of clasping mechanism 88 will pop-out to retain or secure locking ring 94 on outer portions 86A of finger members 86 and secure hook portions 92 of finger members 86 in their engagement of rim 41. Thus, a secure interconnection of framework 20 and console 22 to deck 36 is made to anchoring fixture 38 in deck 36 through finger members 86 extending from clasping mechanism 88.

Each adjustable adapter assembly 10 also can align its clasping mechanism 88 to be secured to anchoring fixtures 38 in deck 36 that are located in different spatial arrangements as compared to the locations of clasping mechanisms 88 on a framework 20. This feature is provided for in each clasping mechanism 88 by having a pair of threaded bores 98 and 100 that orthogonally extend with respect to each other through each shank portion 96. Threaded bolt 74 extends through and mates with threaded bore 98, and threaded bolt 80 extends through and mates with threaded bore 100. Threaded bolt 74 also extends through and is retained in first pair of aligned elongate slots 68 in parallel wall portions 60 and 62 by bolt head 76 and knurled nut 78. Rotation of bolt 74 by knurled nut 78 in one rotational direction will cause an interaction between threaded bolt 74 and threaded bore 98 that displaces shank portion 96 and the rest of clasping mechanism 88 in one lateral direction, and rotation of bolt 74 by knurled nut 78 in the opposite rotational direction will displace shank portion 96 and the rest of clasping mechanism 88 in the opposite lateral direction.

Correspondingly, threaded bolt 80 also extends through and is retained in second pair of aligned elongate slots 70 in parallel wall portions 64 and 66 by bolt head 82 and knurled nut 84. Rotation of bolt 80 by knurled nut 84 in one rotational direction will cause an interaction between threaded bolt 80 and threaded bore 100 that displaces shank portion 96 and the rest of clasping mechanism 88 in one lateral direction and rotation of bolt 80 by knurled nut 84 in the opposite rotational direction will displace shank portion 96 and clasping mechanism 88 in the opposite lateral direction. The selective bidirectional lateral displacements of clasping mechanism 88 by selective bidirectional rotations of threaded bolts 74 and 80 are orthogonal with respect to each other.

Figure 3B:
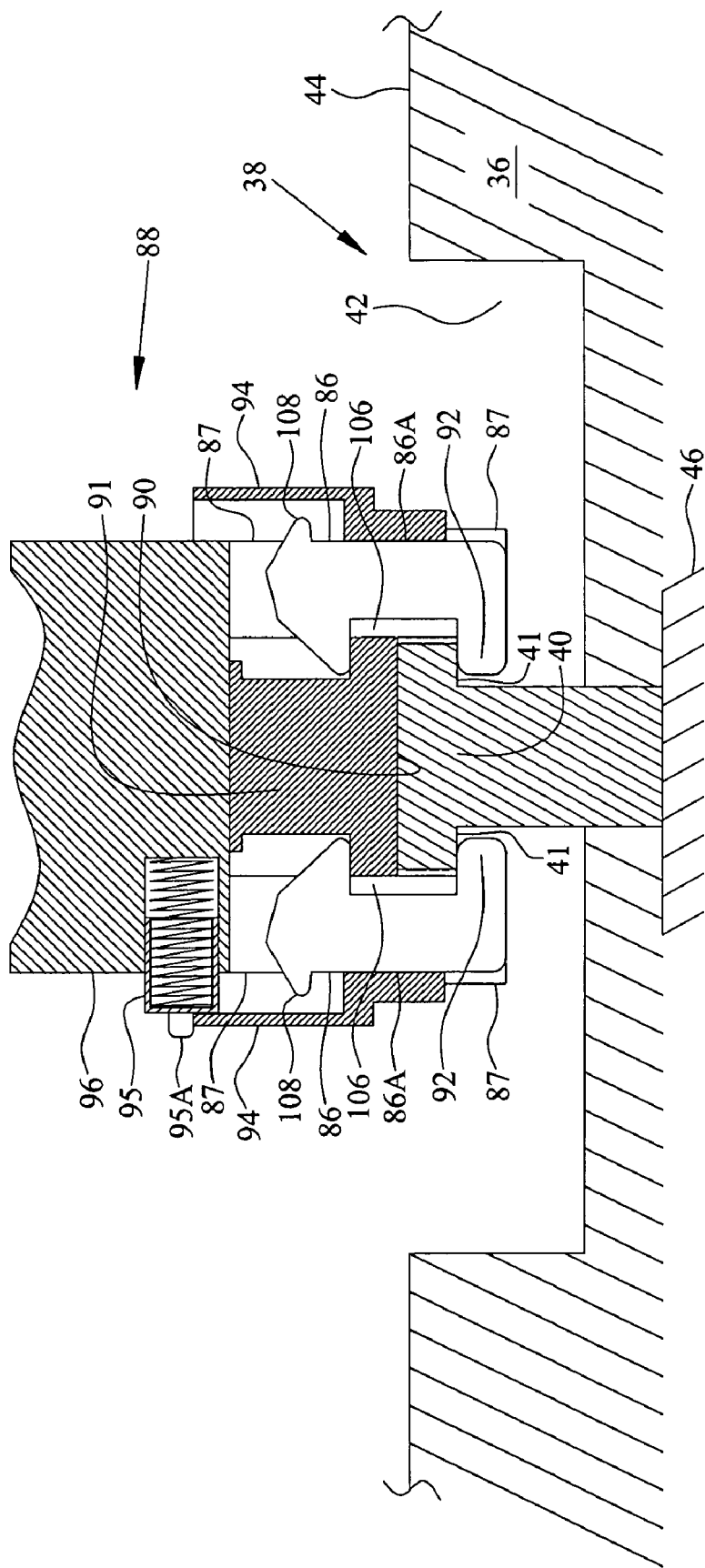
FIG. 3B is a partial cross-section view of the adjustable adapter assembly taken along lines 3-3 in FIG. 2 showing finger members of the clasping mechanism in the closed position engaging a post.

Referring to FIGS. 3A and 3B, each clasping mechanism 88 has a plurality of outwardly radially pivotable finger members 86 each held by locking ring 94 in a separate longitudinally extending slot 106 disposed between adjacent spacer members 87. This structure permits bidirectional rotation of each and all hook portions of finger members 86 toward or away from one another in a selective inwardly converging displacement or outwardly diverging rotational displacement. Locking ring 94 can be manually longitudinally displaced on clasping mechanism 88 to override and compress spur 95A of spring loaded detent mechanism 95 and to bear against an outward projection 108 of each finger member 86. The longitudinal displacement of locking ring 94 and consequent contact with outward projections 108 of finger members 86 will rotate each finger member 86 in an outwardly diverging rotational displacement and hold all finger members 86 in this first or open position. When so displaced, finger members 86 of clasping mechanism 88 can receive and be positioned so as to receive mushroom-shaped post 40 as shown in FIGS. 2 and 3A.

Referring to FIG. 3B, locking ring 94 can be longitudinally displaced manually on clasping mechanism 88 in the opposite direction to a second or closed position to bear against outward surface 86A of each finger member 86. This opposite longitudinal displacement will rotate each finger member 86 in an inwardly converging rotational displacement that positions hook portions 92 of finger members 86 to securely engage annular rim 41 of post 40. This engagement between hook portions 92 of each clasping mechanism 88 and post 40 of each anchoring fixture 38 secures framework 20 and console 22 to deck 36.

Virtually simultaneously, spur 95A of compressed spring-biased detent mechanism 95 on clasping mechanism 88 pops outwardly to abut one side of locking ring 94 and to hold ring 94 and fingers 86 in the closed position. Finger members 86 and hook portions 92 can be released from their closed and securing position by manually depressing or compressing spur 95A of detent mechanism 95 and displacing locking ring 94 to the first or open position as shown in FIGS. 2 and 3A. This allows disengagement of finger members 86 from annular rim 41, and clasping mechanism 88 can be withdrawn from post 40 of anchoring fixture 38.

To quickly secure a console-laden framework 20 to deck 36, leg portions 12 and 14 are positioned so that each end surface 90 of each retainer structure 91 of each shank portion 96 of each clasping mechanism 88 is brought near a separate one of posts 40 of pre-located anchoring fixtures 38 in deck 36. Next, each locking ring 94 is longitudinally displaced to the first position to press against outer projections 108 and force pivotable finger members 86 apart in a pivoted outwardly diverging displacement to receive each post 40.

Under ideal circumstances, all that needs to be done is to slide each locking ring 94 in the opposite direction to the closed position. This movement of rings 94 rotates finger members 86 toward one another in a pivotal inwardly converging displacement that moves hook portions 92 inwardly and causes them to securely engage a separate annular rim 41 of each anchoring fixture 38. In this ideal scenario, a console 22 on framework 20 is secured to deck 36 via interconnected mechanisms 88 and fixtures 38.

However, under more realistic conditions such as those routinely encountered in the field, improper placing of anchoring fixtures 38 in deck 36, distorting or bending of framework 20 and deck 36 through wrong handling or overloading, exceeding manufacturing tolerances in framework 20, etc. can create misalignments. These misalignments between the components of fixtures 38 and mechanisms 88 can prevent their secure interconnection. Forcing or bending of parts of mechanisms 88 and other structural members such as legs 12 and 14 to compensate for improper spacing introduces additional unneeded stresses that can further compromise structural integrity.

Adjustable adapter assembly 10 of the invention securely interconnects framework 20 and deck 36 by allowing selective manual rotation of threaded bolts 74 and 80 via knurled nuts 78 and 84. This selective manual rotation displaces clasping mechanism 88 in two mutually orthogonal directions until finger members 86 are observed as being in a position of alignment with posts 40. Then, each locking ring 94 of each clasping mechanism 88 is manually retracted to the open position as shown in FIGS. 2 and 3A to permit finger members 86 to pivot radially outwardly to each receive a separate post 40.

The leg portions 12 and 14 are positioned so that each end surface 90 of each appropriately aligned clasping mechanism 88 is brought to bear against a separate one of mushroom-shaped posts 40 of pre-located anchoring fixtures 38 in deck 36. Then, each locking ring 94 is manually moved to the closed position as shown in FIG. 3B to force the outwardly pivoted finger members 86 toward one another in a pivotal inwardly converging displacement. This converging displacement moves hook portions 92 of each clasping mechanism 88 inwardly and causes them to securely engage a separate annular rim 41 of each anchoring fixture 38. Thus, framework 20 is secured to deck 36 via aligned, interconnected clasping mechanisms 88 and anchoring fixtures 38.

Adjustable adapter assembly 10 permits securing of a wide variety of packages to preset fixtures such as but not limited to the configuration of anchoring fixture 38. Different mating components of different anchoring fixtures can be appropriately connected to adjustable adapter assembly 10 which can make suitable orthogonal adjustments to assure aligned orientations of interconnecting components. Thus, secure interconnections can be made to mating components in a deck or on any other suitable structural member. The same configuration as disclosed herein or different configurations of either of anchoring fixture 38 or clasping mechanism 88 could be connected directly onto framework 20 or directly onto console 22 without framework 20. One or the other of the mating components of anchoring fixture 38 or clasping mechanism 88 could be accommodated in an aligned fashion by appropriately adjusting threaded bolts 74 and 80 to provide for subsequent securing of fixture 38 and mechanism 88 together. Furthermore, the constituents of adjustable adapter assembly 10 can be made from a host of suitable robust materials to assure structural integrity. Robust non-magnetic materials might be selected to reduce interaction with magnetically influenced systems.

Having the teachings of this invention in mind, modifications and alternate embodiments of adjustable adapter assembly 10 may be adapted. Its uncomplicated, compact design lends itself to numerous modifications to permit its use in many demanding environments and on mobile platforms under conditions that extend between the limits of ambient hot and cold. Adjustable adapter assembly 10 can be made larger or smaller and fabricated from a wide variety of materials to assure sufficient strength and long term reliable operation under different operational requirements. Housing member 48 could have different shapes, and anchoring fixture 38 and clasping mechanism 88 could have different arrangements of different numbers of differently shaped structural members to assure positive mating and interconnection.

The disclosed components and their arrangements as disclosed herein, all contribute to the novel features of this invention. Adjustable adapter assembly 10 is a rugged, cost-effective, means for assuring secure interconnection of an instrumentation and electronics console 22 to deck 36 or other stable surface. One or more adjustable adapter assemblies can align with one or more pre-located mounting fixtures and secure seat racks, equipment racks, storage containers, and anything else that needs alignment and securing to a deck, fuselage, wall, ceiling, etc. Therefore, adjustable adapter assembly 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

I claim:

1. An apparatus for securing a console to an anchoring surface comprising:
    a housing member connected to a console and having a first pair of parallel walls and a second pair of parallel walls, said first pair of parallel walls having laterally aligned elongate first slots and said second pair of parallel walls having laterally aligned elongate second slots;
    a clasping mechanism having a shank portion, finger members extending from said shank portion, and a locking ring on said finger members, said shank portion being disposed inside of said housing member between said first and second pairs of parallel walls and having first and second bores laterally extending through said shank portion in a mutually orthogonal relationship;
    a first bolt extending through said first slots and said first bore and a second bolt extending through said second slots and said second bore; and
    an anchoring fixture having a part for engagement by said finger members at an anchoring surface.

2. The apparatus of claim 1 wherein said locking ring is displaceable to an open position on said finger members to rotate each finger member in an outwardly diverging rotational displacement for receiving and being positioned about said part of said anchoring fixture.

3. The apparatus of claim 2 wherein said locking ring is displaceable to a closed position on said finger members to rotate each finger member in an inwardly converging rotational displacement for engaging said part of said anchoring fixture.

4. The apparatus of claim 3 wherein engagement between said finger members and said part of said anchoring fixture secures said console to said anchoring surface.

5. The apparatus of claim 4 wherein said first bolt is threaded and has a knurled knob at one end, said first bore in said shank portion has mating threads with respect to said threaded first bolt, said second bolt is threaded and has a knurled knob at one end, and said second bore in said shank portion has mating threads with respect to said threaded second bolt.

6. The apparatus of claim 5 wherein applying selective bidirectional rotational forces to said knurled knob of said first bolt imparts selective lateral displacements of said clasping mechanism, applying selective bidirectional rotational forces to said knurled knob of said second bolt imparts selective lateral displacements of said clasping mechanism, and said lateral displacements imparted by said first bolt are orthogonal to said lateral displacements imparted by said second bolt, thereby permitting alignment of said finger members with said part of said anchoring fixture.

7. The apparatus of claim 6 wherein said clasping mechanism has a spring-biased detent mechanism abutting said locking ring for holding said locking ring in said closed position.

8. The apparatus of claim 7 wherein said locking ring is released from said closed position by manually depressing said detent mechanism and displacing said locking ring to said open position to permit withdrawal of said clasping mechanism from said part of said anchoring fixture.

9. The apparatus of claim 8 wherein said anchoring fixture is recessed below a deck anchoring surface and said part of said anchoring fixture is a mushroom-shaped post having a rim for engagement by hook-like projections of said finger members.

10. The apparatus of claim 1 further comprising:
    a framework connected to said console and having a plurality of supporting legs;
    a plurality of said housing members each connected to a separate one of said legs of said framework;
    a plurality of said clasping mechanisms each in a separate one of said housing members;
    a plurality of first bolts each extending through a separate pair of said laterally aligned elongate first slots and a first bore of a separate clasping mechanism;
    a plurality of second bolts each extending through a separate pair of said laterally aligned elongate second slots and a second bore of said separate clasping mechanism; and
    a plurality of anchoring fixtures in said anchoring deck surface, said anchoring fixtures being located to enable each one of said plurality of said clasping mechanisms to engage one of said plurality of anchoring fixtures.

11. The apparatus of claim 10 wherein selective rotation of selective ones of said first bolts of said clasping mechanisms imparts selective lateral displacements of said selective ones of said clasping mechanisms, selective rotation of selective ones of said second bolts imparts selective lateral displacements of said selective ones of said clasping mechanisms, and said lateral displacements imparted by said first bolts are orthogonal to said lateral displacements imparted by said second bolts to assure alignment of said clasping mechanisms to said plurality of anchoring fixtures.

12. A method of securing a framework coupled to a console to a deck comprising the steps of:
  connecting a housing member to a framework coupled to a console, said housing member having a first pair of parallel walls and a second pair of parallel walls, said first pair of parallel walls having laterally aligned elongate first slots and said second pair of parallel walls having laterally aligned elongate second slots;
  placing a clasping mechanism inside said housing member, said clasping mechanism having a shank portion, finger members extending from said shank portion, and a locking ring coupled to said finger members, said shank portion being disposed inside of said housing member between said first and second pairs of parallel walls and having first and second threaded bores laterally extending through said shank portion in a mutually orthogonal relationship;
  extending a first threaded bolt through said first slots and said first threaded bore;
  extending a second threaded bolt through said second slots and said second threaded bore; and
  engaging said clasping mechanism over an anchoring fixture mounted on an anchoring surface, said anchoring fixture having a part for engagement by said finger members.

13. The method of claim 12 further comprising the steps of:
  rotating said first and second threaded bolts in said first and second threaded bores, thereby laterally displacing said clasping mechanism in separate lateral displacements orthogonal with respect to each other; and
  aligning said finger members with said part of said anchoring fixture to assure said step of engaging of said part of said anchoring fixture by said clasping mechanism.

14. The method of claim 13 further including the step of:
  displacing said locking ring to an open position on said finger members to rotate each finger member in an outwardly diverging rotational displacement for receiving and being positioned about said part of said anchoring fixture; and
  displacing said locking ring to a closed position on said finger members to rotate each finger member in an inwardly converging rotational displacement to assure said step of engaging of said part of said anchoring fixture by said finger members.

15. An apparatus for securing a leg of a framework to a mushroom-shaped anchoring fixture mounted on a deck and having an annular rim, said apparatus comprising:
  a housing member coupled to said leg, said housing member having a first pair of parallel walls and a second pair of parallel walls, said first pair of parallel walls having laterally aligned elongate first slots and said second pair of parallel walls having laterally aligned elongate second slots;
  a clasping mechanism having
    i) a shank portion, said shank portion being disposed inside said housing member between said first and second pairs of parallel walls and having first and second threaded bores laterally extending through said shank portion in a mutually orthogonal relationship,
    ii) a plurality of finger members hingeably coupled to and extending from said shank portion, said finger members having hook portions suitable for engaging the annular rim of said anchoring fixture,
    iii) a plurality of spacer members extending from said shank portion and interdigitally alternately disposed between said finger members, said spacer members arranged to allow the annular rim of said anchoring fixture to fit therebetween,
    iv) a locking ring coupled to said finger members, said locking ring being displaceable to an open position on said finger members to rotate each finger member in an outwardly diverging rotational displacement for receiving and being positioned about the annular rim of said anchoring fixture, and said locking ring being displaceable to a closed position on said finger members to rotate each finger member in an inwardly converging rotational displacement for engaging the annular rim of said anchoring fixture, and
    v) a spring-biased detent mechanism abutting said locking ring for holding said locking ring in said closed position and configured to release said locking ring from said closed position when said detent mechanism is manually depressed and said locking ring is raised above said detent mechanism;
  a first bolt extending through said first slots in said housing member and threadably engaging said first threaded bore in said shank portion to allow selective lateral displacements of said clasping mechanism; and
  a second bolt extending through said second slots in said housing member and threadably engaging said second threaded bore in said shank portion to allow selective lateral displacements of said clasping mechanism in directions orthogonal to said lateral displacements allowed by said first bolt.

* * * * *